(12) United States Patent
Hayashi et al.

(10) Patent No.: US 10,628,713 B2
(45) Date of Patent: Apr. 21, 2020

(54) MOBILE TERMINAL, IMAGE PROCESSING METHOD, AND COMPUTER-READABLE RECORDING MEDIUM

(71) Applicant: PFU LIMITED, Kahoku-shi, Ishikawa (JP)

(72) Inventors: Masayoshi Hayashi, Ishikawa (JP); Kiyoto Kosaka, Ishikawa (JP)

(73) Assignee: PFU Limited, Ishikawa (JP)

( * ) Notice: Subject to any disclaimer, the term of this patent is extended or adjusted under 35 U.S.C. 154(b) by 163 days.

(21) Appl. No.: 15/994,920

(22) Filed: May 31, 2018

(65) Prior Publication Data

US 2018/0276509 A1     Sep. 27, 2018

Related U.S. Application Data (63) Continuation of application No. PCT/JP2015/086428, filed on Dec. 25, 2015.

(51) Int. Cl.
    *G06K 9/72*     (2006.01)
    *H04N 5/232*     (2006.01)
    (Continued)

(52) U.S. Cl.
    CPC .......... *G06K 9/72* (2013.01); *G06K 9/00442* (2013.01); *G06K 9/00463* (2013.01);
    (Continued)

(58) Field of Classification Search
    CPC ....... H04N 2201/0081; H04N 1/00251; H04N 1/00307; H04N 1/00801; H04N 1/19594
    See application file for complete search history.

(56) References Cited

U.S. PATENT DOCUMENTS

| | | | | |
|---|---|---|---|---|
| 7,016,531 | B1 * | 3/2006 | Murching | G06K 9/342 |
| | | | | 382/164 |
| 7,024,046 | B2 * | 4/2006 | Dekel | H04N 1/3873 |
| | | | | 375/240.19 |

(Continued)

FOREIGN PATENT DOCUMENTS

| | | |
|---|---|---|
| JP | S62-049584 A | 3/1987 |
| JP | H01-276384 A | 11/1989 |

(Continued)

OTHER PUBLICATIONS

Search Report issued in corresponding International Patent Application No. PCT/JP2015/086428, dated Feb. 16, 2016.

(Continued)

*Primary Examiner* — Yosef Kassa
(74) *Attorney, Agent, or Firm* — McDermott Will & Emery LLP (57) ABSTRACT

A mobile terminal includes a memory and a processor coupled to the memory, wherein the processor executes a process including acquiring a frame acquired by image capturing, detecting document position data of a document from the frame, determining a document type of the document, calculating image quality of document image data of the document on the basis of the document position data and the document type, determining whether the image quality is at a character recognizable level, and acquiring a frame acquired by the image recapturing when it is determined that the image quality is not at the character recognizable level.

16 Claims, 3 Drawing Sheets

(51) Int. Cl.
*G06K 9/00* (2006.01)
*G06K 9/03* (2006.01)
*G06K 9/22* (2006.01)
*H04N 19/172* (2014.01)
*G06K 9/20* (2006.01)
*G06K 9/46* (2006.01)

(52) U.S. Cl.
CPC .......... *G06K 9/036* (2013.01); *G06K 9/2063* (2013.01); *G06K 9/22* (2013.01); *G06K 9/228* (2013.01); *G06K 9/4604* (2013.01); *H04N 5/232* (2013.01); *H04N 5/23232* (2013.01); *H04N 19/172* (2014.11); *G06K 2209/01* (2013.01)

(56) References Cited

U.S. PATENT DOCUMENTS

| | | | | |
|---|---|---|---|---|
| 8,326,069 | B2* | 12/2012 | Maslov | G06T 3/4053 |
| | | | | 382/254 |
| 8,719,197 | B2* | 5/2014 | Schmidtler | G06Q 10/10 |
| | | | | 706/20 |
| 8,855,375 | B2* | 10/2014 | Macciola | H04N 1/00251 |
| | | | | 382/112 |
| 9,047,531 | B2* | 6/2015 | Showering | G06K 9/033 |
| 2002/0122590 | A1 | 9/2002 | Kaneda | |
| 2007/0206884 | A1 | 9/2007 | Kato | |
| 2015/0146020 | A1 | 5/2015 | Imaizumi et al. | |

FOREIGN PATENT DOCUMENTS

| | | |
|---|---|---|
| JP | 2000-67155 A | 3/2000 |
| JP | 2005-202834 A | 7/2005 |
| JP | 2007-233913 A | 9/2007 |
| JP | 2010-273218 A | 12/2010 |
| JP | 2015-102915 A | 6/2015 |
| JP | 2015-106742 A | 6/2015 |
| WO | 2011/129113 A1 | 10/2011 |
| WO | 2013/099025 A1 | 7/2013 |

OTHER PUBLICATIONS

Japanese Office Action issued in corresponding Japanese Patent Application No. 2017-557667, dated Mar. 12, 2019, with English translation.

* cited by examiner

… (1) MOBILE TERMINAL, IMAGE PROCESSING METHOD, AND COMPUTER-READABLE RECORDING MEDIUM

CROSS-REFERENCE TO RELATED APPLICATION

This application is a continuation of International Patent Application No. PCT/JP2015/086428, filed on Dec. 25, 2015, the entire contents of which are incorporated herein by reference.

FIELD

The present disclosure discussed herein is related to a mobile terminal, an image processing method, and a computer-readable recording medium.

BACKGROUND

Conventionally, a technique of applying image processing after capturing an image, displaying a result on a screen, and urging a user to perform subsequent operations.

A technique concerning high-resolution correction in which an image determination is performed from an image group to be subjected to the high-resolution correction on the basis of a tilt and a shift amount, an optimal image with little distortion is selected, and an image quality after correction is increased has been disclosed.

A technique for performing image determination concerning blur, a document type, and a tilt after capturing has been disclosed.

A technique of determining the image quality of the resolution of a captured image from a specified target resolution and size data showing a previously input object and generating a composite image has been disclosed.

Examples of related-art are described in JP-A-2010-273218, JP-A-2015-106742 and WO2013/099025A1.

However, in a conventional apparatus, not only determination as to whether character recognition is possible and automatic image capturing are not performed, but also the determination whether image processing is successful is left to the user. Therefore, there is a problem that when the user determines that the image processing has failed, a processing has to be redone from image capturing, remarkably impairing operability.

SUMMARY

According to an aspect of an embodiment, a mobile terminal includes a memory and a processor coupled to the memory, wherein the processor executes a process including acquiring a frame acquired by image capturing, detecting document position data of a document from the frame, determining a document type of the document, calculating image quality of document image data of the document on the basis of the document position data and the document type, determining whether the image quality is at a character recognizable level, and acquiring a frame acquired by the image recapturing when it is determined that the image quality is not at the character recognizable level.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the disclosure will be explained with reference to accompanying drawings. Note that the present disclosure is not limited by this embodiment.

Configuration of Present Embodiment

Figure 1:
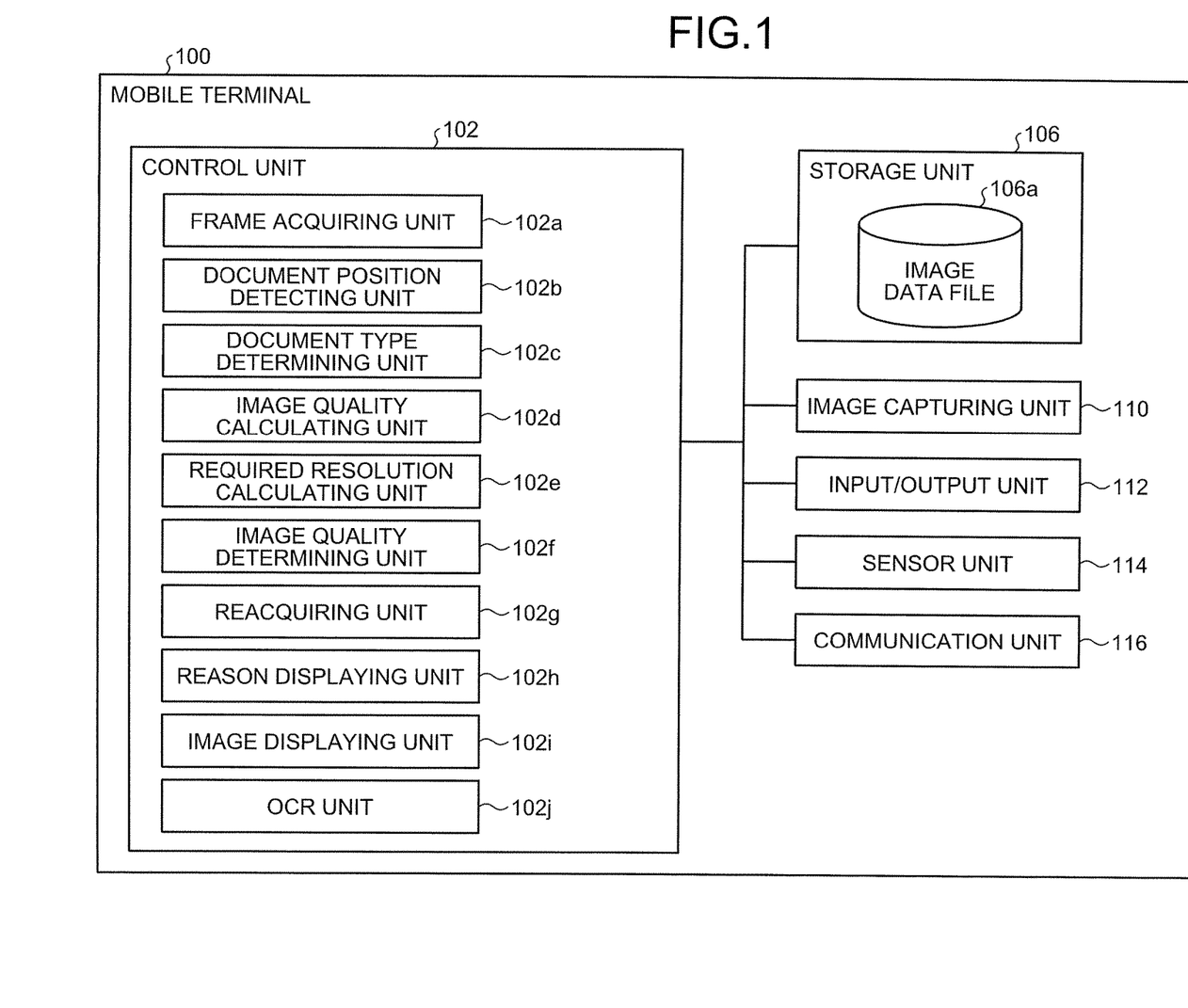
FIG. 1 is a block diagram showing an exemplary configuration of a mobile terminal according to the present embodiment.

Hereinafter, an exemplary configuration of the mobile terminal 100 according to the embodiment of the present disclosure will be explained with reference to FIG. 1, and thereafter processing and the like of the present embodiment will be explained in detail. FIG. 1 is a block diagram showing an exemplary configuration of the mobile terminal 100 according to the present embodiment.

However, the embodiment shown below exemplifies the mobile terminal 100 for embodying a technical idea of the present disclosure, is not intended to specify the present disclosure to this mobile terminal 100 and is applied equally to mobile terminals 100 of other embodiments included in claims.

The form of function distribution in the mobile terminal 100 exemplified in the present embodiment is not limited to the following and is configured to be distributed or integrated functionally or physically in any units within a scope in similar effects and functions are possible to be achieved.

The mobile terminal 100 may be a portable information processing device having portability, such as a tablet terminal, a mobile phone, a smartphone, a personal handyphone system (PHS), a personal digital assistant (PDA), and a laptop personal computer.

First, as shown in FIG. 1, the mobile terminal 100 schematically includes a control unit 102, a storage unit 106, an image capturing unit 110, an input/output unit 112, a sensor unit 114, and a communication unit 116.

Though not shown in FIG. 1, in the present embodiment, an input/output interface unit (not shown) for connecting the input/output unit 112 and the control unit 102 may be further provided. The respective units of the mobile terminal 100 are communicably connected via any communication path.

The communication unit 116 may be a network interface (network interface controller (NIC) or the like) for transmitting and receiving IP data by wired communication and/or wireless communication (wireless fidelity (WiFi) or the like), Bluetooth (registered trademark), an interface that performs wireless communication by infrared communication or the like.

The mobile terminal 100 may be connected so as to be capable of communicating with an external device via a network by using the communication unit 116.

The sensor unit 114 detects a physical amount and converts the physical quantity into a signal (digital signal) of another medium. The sensor unit 114 may include a proximity sensor, a direction sensor, a magnetic field sensor, a linear acceleration sensor, a luminance sensor, a gyro sensor, a pressure sensor, a gravity sensor, an acceleration sensor, a barometric pressure sensor, and/or a temperature sensor.

The input/output unit 112 performs input/output (I/O) of data. The input/output unit 112 may be, for example, a key input unit, a touch panel, a control pad (for example, a touch pad and a game pad), a mouse, a keyboard, and/or a microphone.

The input/output unit 112 may be a display unit (for example, a display that includes a liquid crystal, organic electroluminescence (EL) or the like, a monitor, and a touch panel) for displaying a display screen of an application or the like.

The input/output unit 112 may be a sound output unit (for example, a speaker) that outputs sound information as sound. The input/output unit (touch panel) 112 may include the sensor unit 114 that detects physical contact and converts the physical contact into a signal (digital signal).

The image capturing unit 110 acquires the image data (frame) of a continuous (moving image) by performing continuous image capturing (moving image capturing) of an object (for example, a document). Furthermore, the image capturing unit 110 may acquire video data. The image capturing unit 110 may acquire ancillary data.

The image capturing unit 110 may be a camera or the like including an imaging device that is a charge coupled device (CCD), and/or a complementary metal oxide semiconductor (CMOS).

The image capturing unit 110 may acquire the image data of a still image by capturing a still image of the object. The frame may be uncompressed image data. The frame may be high-resolution image data.

The high resolution may be full high vision, 4K resolution, Super Hi-Vision (8K resolution), or the like. The image capturing unit 110 may capture a moving image at 24 fps, 30 fps, or the like.

The storage unit 106 is a memory such as a random access memory (RAM) or a read-only memory (ROM), a fixed disk device such as a hard disk, a solid state drive (SSD), and/or an optical disk are possible to be used.

The storage unit 106 stores various databases, tables, buffers, and/or files (such as an image data file 106a). In the storage unit 106, a computer program or the like for giving instructions to a central processing unit (CPU) and performing various types of processing may be recorded.

In addition, the storage unit 106 stores a quality index value (Japanese Industrial Standards (JIS) B 7187: 2007, International Organization for Standardization (ISO) 3272-1: 2003, or ISO 6199: 2005 or the like) according to the document type, standard data including the length of the side of the document, character size at which characters are recognizable by an optical character recognition (OCR) engine, and the like.

Among the constituent elements of the storage unit 106, the image data file 106a stores image data (frames and the like). The image data file 106a may store document position data. The image data file 106a may store document image data.

The image data file 106a may store the document resolution of the document image data. The image data file 106a may store character data corresponding to the image data. The image data file 106a may store video data. The image data file 106a may store ancillary data.

The control unit 102 includes the CPU and the like which comprehensively control the mobile terminal 100. The control unit 102 has an internal memory for storing a control program, programs defining various processing procedures and the like, and necessary data, and performs information processing for executing various types of processing on the basis of these programs.

The control unit 102 includes a frame acquiring unit 102a, a document position detecting unit 102b, a document type determining unit 102c, an image quality calculating unit 102d, a required resolution calculating unit 102e, an image quality determining unit 102f, a reacquiring unit 102g, a reason displaying unit 102h, an image displaying unit 102i, and an OCR unit 102j in terms of functional concepts.

The frame acquiring unit 102a acquires image data (frame). The frame acquiring unit 102a may acquire image data acquired by image capturing by the image capturing unit 110. The frame acquiring unit 102a may acquire non-compressed and high resolution image data.

The frame acquiring unit 102a may control the continuous image capturing or the moving image capturing by the image capturing unit 110 to acquire image data (frame) corresponding to one frame. The frame acquiring unit 102a may control the still image capturing by the image capturing unit 110 to acquire image data. The frame acquiring unit 102a may acquire the ancillary data.

The document position detecting unit 102b detects the document position data of the document from the frame. The document position detecting unit 102b may detect the corner coordinates of the document from the frame. The document position detecting unit 102b may detect the layout of the document from the frame.

The document position detecting unit 102b may detect the document position data of the document from the frame by using an edge detection method and/or a feature point matching method. The document may be a rectangular document. The document position detecting unit 102b may further acquire the document image data of the document on the basis of the document position data.

The document type determining unit 102c determines the document type of the document. The document type determining unit 102c may determine the document type of the document by using a layout recognition method and/or a size detection method.

The image quality calculating unit 102d calculates the image quality of the document image data of the document. The image quality calculating unit 102d may calculate the image quality of the document image data of the document on the basis of the document position data and the document type. The image quality calculating unit 102d may calculate the document resolution of the document image data on the basis of the corner coordinates and the document type.

The image quality calculating unit 102d calculates the resolution of the document image data on the basis of the number of pixels between the corner coordinates and the length of the side of the document based on the document type and acquires the resolution that is minimum as the document resolution.

The image quality calculating unit 102d may calculate the number of pixels between the corner coordinates. The image quality calculating unit 102d may calculate the document resolution of the document image data on the basis of the layout and the document type.

The required resolution calculating unit 102e calculates a required resolution necessary for character recognition. The required resolution calculating unit 102e may calculate the required resolution necessary for character recognition on the basis of the quality index value and the document type. The required resolution calculating unit 102e may calculate the required resolution on the basis of the character size that enables character recognition by OCR and the document type.

The image quality determining unit 102f determines whether the image quality is at a character recognizable level. The image quality determining unit 102f may determine whether the document resolution is at the character recognizable level. On the basis of a comparison between the document resolution and the required resolution, the image quality determining unit 102f may determine whether the document resolution is at the character recognizable level.

The reacquiring unit 102g acquires image data by image recapturing by the image capturing unit 110. When the image quality determining unit 102f determines that the image quality is not at the character recognizable level, the reacquiring unit 102g may acquire a frame by image recapturing by the image capturing unit 110.

The reacquiring unit 102g may acquire a new frame by controlling image capturing by the image capturing unit 110 (continuous image capturing, moving image capturing, still image capturing, or the like). The reacquiring unit 102g may further store the acquired frame in the image data file 106a.

The reason displaying unit 102h displays determination reason data. When the image quality determining unit 102f determines that the image quality is not at the character recognizable level, the reason displaying unit 102h may display the determination reason data. The reason displaying unit 102h may cause the input/output unit 112 to display the determination reason data.

The image displaying unit 102i displays the image data. The image displaying unit 102i may display the frame and/or the document image data. The image displaying unit 102i may cause the input/output unit 112 to display the image data.

The OCR unit 102j performs OCR processing on the image data to acquire character data. The OCR unit 102j may perform the OCR processing on document image data or a frame to acquire character data. The OCR unit 102j may further store the acquired character data in the image data file 106a.

Processing of Present Embodiment

Figure 2:
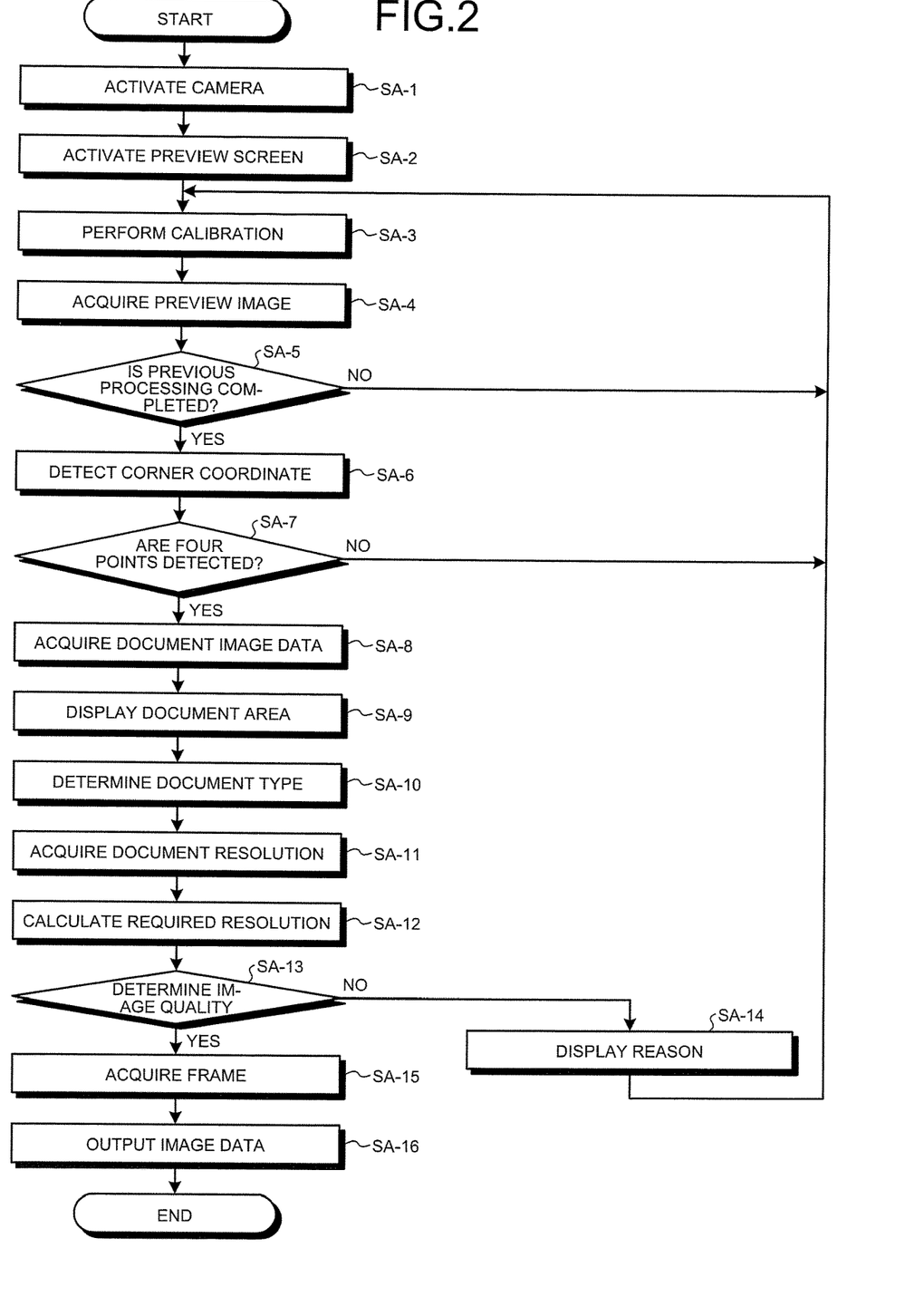
FIG. 2 is a flowchart showing an example of processing in the mobile terminal of the present embodiment.
Figure 3:
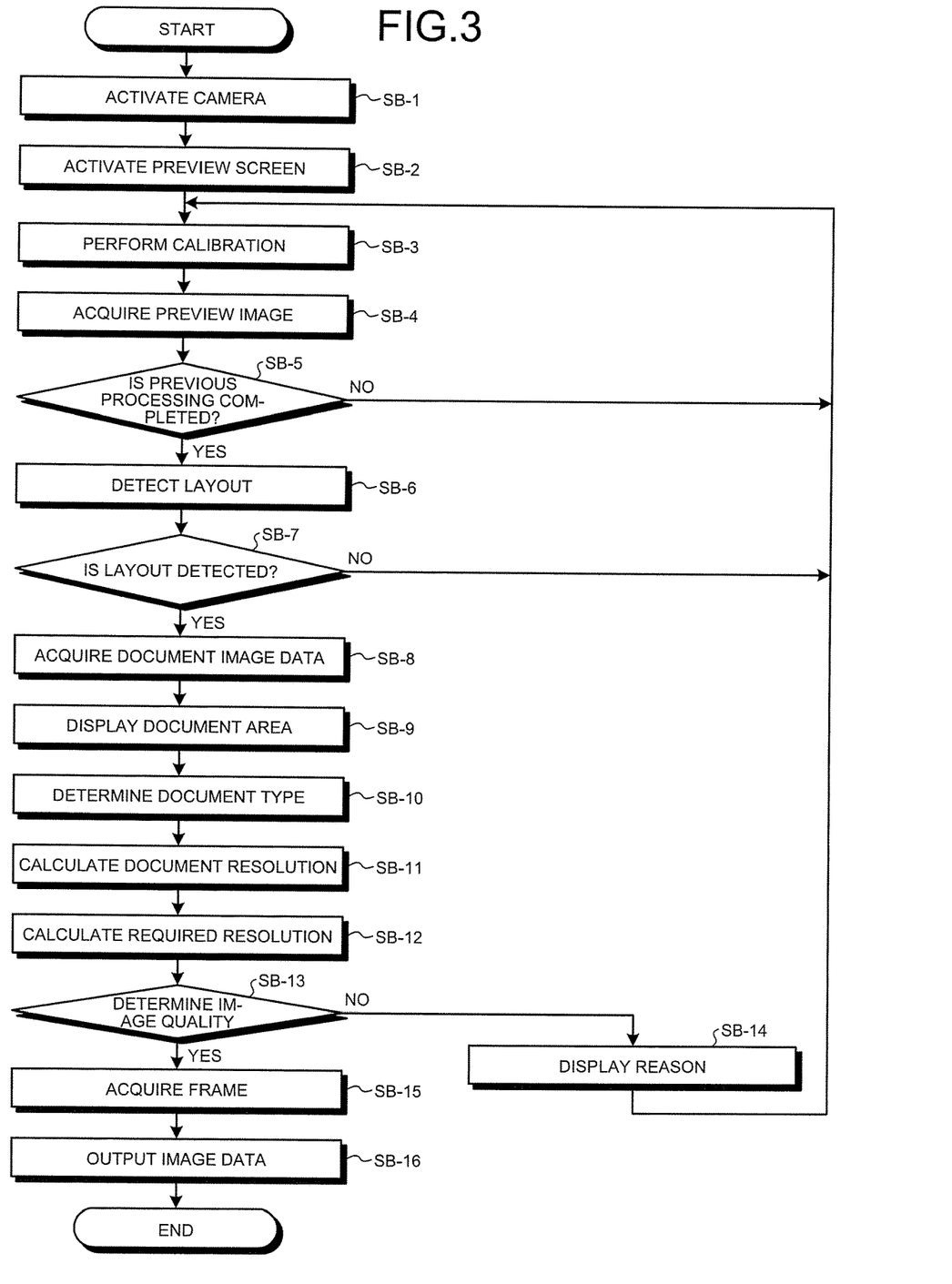
FIG. 3 is a flowchart showing an example of processing in the mobile terminal of the present embodiment.

An example of processing executed by the mobile terminal 100 having the configuration will be explained with reference to FIG. 2. FIGS. 2 and 3 are flowcharts showing an example of processing in the mobile terminal 100 according to the present embodiment.

Automatic Image Capturing Processing (Part 1)

As shown in FIG. 2, first, the control unit 102 activates the image capturing unit 110 (step SA-1). A mobile camera is an example of the image capturing unit 110. That is, in the present embodiment, the mobile camera for image capturing of a document may be activated.

Then, the image displaying unit 102i causes the input/output unit 112 to display the image data of a preview screen (preview image) captured by the image capturing unit 110 (step SA-2).

Then, the control unit 102 performs the calibration of the input/output unit 112 (step SA-3). The control unit 102 may further perform the calibration of the image capturing unit 110.

Then, the frame acquiring unit 102a acquires a non-compressed and high resolution frame of the preview image captured by the image capturing unit 110 (step SA-4).

Then, the control unit 102 determines whether previous processing has been completed (step SA-5). The previous processing may be any one of the processing from step SA-6 to step SA-16 with respect to the frame previously acquired by the frame acquiring unit 102a.

When the control unit 102 determines that the previous processing has not been completed (step SA-5: No), the control unit 102 shifts the processing to step SA-3.

On the other hand, when the control unit 102 determines that the previous processing has been completed (step SA-5: Yes), the control unit 102 shifts the processing to step SA-6.

Then, by using the edge detection method and/or the feature point matching method, the document position detecting unit 102b detects the corner coordinates of the document (rectangular document) from the frame of the preview image (step SA-6). That is, in the present embodiment, four corners of a rectangular document may be detected.

Then, the document position detecting unit 102b determines whether the corner coordinates of four points have been detected (step SA-7).

Then, when the document position detecting unit 102b determines that the corner coordinates of the four points have not been detected (step SA-7: No), the document position detecting unit 102b shifts the processing to step SA-3.

On the other hand, when the document position detecting unit 102b determines that the corner coordinates of four points have been detected (step SA-7: Yes), the document position detecting unit 102b shifts the processing to step SA-8.

Then, on the basis of the detected corner coordinates of the four points, the document position detecting unit 102b acquires the document image data of the rectangular document (document area) from the frame of the preview image (step SA-8).

Then, the image displaying unit 102i causes the input/output unit 112 to display the document image data of the document area (step SA-9).

Then, the document type determining unit 102c determines the document type of the rectangular document by using the layout recognition method and/or the size detection method (step SA-10). That is, in the present embodiment, the document type may be discriminated.

Then, the image quality calculating unit 102d calculates the resolution of the document image data on the basis of the number of pixels between the four corner coordinates and the length of the side of the rectangular document based on the document type, and acquires the resolution that is minimum as the document resolution (step SA-11).

The image quality calculating unit 102d may calculate the resolution of the document image data (camera image data) from the results of the four-point coordinates and the document type determination, according to an expression "resolution (dpi)=the number of pixels (dot)/length (inch)".

For example, when the image quality calculating unit 102d calculates the top side:600 dots and the bottom side: 800 dots if the document type determining unit 102c determines that the document is a business card, the image quality calculating unit 102d calculates vertical resolution as 600 dot/(55 mm/25.4 mm)=277 dpi (that is, 1 inch=25.4 mm).

Then, the image quality calculating unit 102d calculates that a horizontal resolution is 1200 dot/(91 mm/25.4 mm)=335 dpi when the document position detecting unit 102b calculates that the right side is 1200 dots and the left side is 1324 dots.

Then, the image quality calculating unit 102d acquires the vertical resolution (277 dpi) as the minimum resolution as the document resolution. Thus, in the present embodiment, the resolution of the captured image data is calculated from the two-point coordinates and the document type.

The document resolution may be calculated by using a standard that a short side is 54 mm and a long side is 86 mm when the document type is a license card or an insurance card, a standard that a short side is 55 mm and a long side is 91 mm in the case of a business card, and a standard that a short side is 210 mm and a long side is 297 mm in the case of A4 paper.

Then, the required resolution calculating unit 102e calculates the required resolution necessary for character recognition on the basis of the quality index value and the document type (step SA-12). That is, the required resolution calculating unit 102e may calculate the required resolution from the information of the document (point number).

In the case of using the quality index value P concerning a quality standard for visual inspection (for example, JISB7187: 2007 and TNF-2005408 ST), the required resolution calculating unit 102e may calculate the required resolution according to a formula "DPI={P/(pt*0.3514)}*2*25.4".

The quality standard for visual inspection specifies that when fine parts of all characters are clearly drawn, quality is "excellent", when characters are readable without difficulty even if characters are somewhat unclear, the quality is "readable", and when characters are legible even if the characters are partially collapsed, the quality is "legible".

In the case of "excellent", the quality index value P is 18 for a kanji and 8 for an alphabet. In the case of "readable", the quality index value P is 11 for a kanji and 5 for an alphabet. In the case of "legible", the quality index value P is 7 for a kanji and 3 for an alphabet.

In the present embodiment, on the basis of the information of each document, 6 pt may be taken as a character point number for the license card, the insurance card, the business card, 10.5 pt may be taken as a character point number for the A4 paper, and these numbers may be taken as character sizes used for calculation of the required resolution.

For example, when the document type is the license card, the required resolution calculating unit 102e may take 6 pt as the character point number and calculate the required resolution as DPI={11/(6*0.3514)}*2*25.4=265 dpi. Thus, in the present embodiment, the resolution necessary for character recognition according to the size of the document type and the point number is calculated.

Then, on the basis of the comparison between the document resolution and the required resolution, the image quality determining unit 102f determines whether the document resolution is at the character recognizable level (step SA-13). In the present embodiment, the image quality determining unit 102f may determine whether stepwise character recognition is possible.

Then, when the image quality determining unit 102f determines that the document resolution is not at the character recognizable level (step SA-13: No), the image quality determining unit 102f shifts the processing to step SA-14.

Then, the reason displaying unit 102h causes the input/output unit 112 to display the determination reason data as to why the image quality determining unit 102f determines that the document resolution is not at the character recognizable level (step SA-14) and shifts the processing to SA-3.

Thus, in the present embodiment, a retry may be repeated until an image quality condition is satisfied. That is, in the present embodiment, the processing may be repeated until a predetermined image quality is satisfied.

On the other hand, when the image quality determining unit 102f determines that the document resolution is at the character recognizable level (step SA-13: Yes), the image quality determining unit 102f shifts the processing to step SA-15.

Then, the reacquiring unit 102g acquires the frame used for the image quality determination by the image quality determining unit 102f, or controls image capturing by the image capturing unit 110 to acquire a new high resolution and uncompressed frame and stores the frame in the image data file 106a (step SA-15).

Then, the image displaying unit 102i causes the input/output unit 112 to output (display) the frame (image data) used for the image quality determination, the new frame (image data) acquired by the reacquiring unit 102g, or the document image data of the document area included in the frame (step SA-16) and ends the processing.

The OCR unit 102j further may perform the OCR processing on document image data or the frame displayed on the input/output unit 112 to acquire character data, stores the character data in the image data file 106a.

Thus, in the present embodiment, in the high resolution and non-compressed frame (image data) captured by an area sensor of the image capturing unit 110, the coordinates of the four corners of the rectangular document are detected to determine the document type.

In the present embodiment, the resolution of the camera image data is calculated from this determination result, and the resolution of the camera image data is compared with a predetermined required resolution, and it is determined whether the image is a character-recognizable image.

In the present embodiment, image data satisfying the predetermined image quality is possible to be acquired by repeating this determination processing until the predetermined image quality is satisfied.

In the present embodiment, for example, in a personal authentication procedure in counter service, an image of an identification card borrowed from a customer is captured on the spot with the mobile terminal (portable image capturing apparatus) 100. As a result, a sense of security is possible to be given to the customer.

When a target document is a license card (54 mm*86 mm, 6 points), the resolution necessary for visual confirmation (readable) (required resolution) may be 265 dpi (image size: 564 dot*898 dot).

In the present embodiment, this required resolution is compared with the resolution of the camera image data. As a result, an image optimal for character recognition is possible to be captured.

In addition, in the present embodiment, furthermore, when a target of image capturing is determined, responsiveness is improved by performing the retry process at the stage of document type determination.

Furthermore, in the present embodiment, the input/output unit 112 is caused to display, as text data or drawing data, a factor that automatic image capturing is not performed as text data or drawing data. As a result, the user is notified of the factor in real time and is urged to make an improvement. This results in improving usability.

Automatic Image Capturing Processing (Part 2)

First, since the processing from step SB-1 to step SB-5 shown in FIG. 3 is the same as the processing from step SA-1 to step SA-5 shown in FIG. 2, explanation thereof will be omitted.

Then, the document position detecting unit 102*b* detects the layout of the document (rectangular document) from the frame of the preview image by using the edge detection method and/or the feature point matching method (step SB-6).

Then, the document position detecting unit 102*b* determines whether the layout have been detected (step SB-7).

Then, when determining that the layout is not possible to be detected (step SB-7: No), the document position detecting unit 102*b* shifts the processing to step SB-3.

On the other hand, when determining that the layout is possible to be detected (step SB-7: Yes), the document position detecting unit 102*b* shifts the processing to step SB-8.

Then, on the basis of the detected layout, the document position detecting unit 102*b* acquires the document image data of the rectangular document (document area) from the frame of the preview image (step SB-8).

Then, the image displaying unit 102*i* causes the input/output unit 112 to display the document image data of the document area (step SB-9).

Then, the document type determining unit 102*c* determines the document type of the rectangular document by using the layout recognition method and/or the size detection method (step SB-10).

Then, the image quality calculating unit 102*d* calculates the document resolution of the document image data on the basis of the layout of the rectangular document and the document type (step SB-11).

Then, the required resolution calculating unit 102*e* calculates the required resolution necessary for character recognition on the basis of the character size that enables character recognition by OCR and the document type (step SB-12).

When a character size F at which characters are recognizable by the OCR engine (OCR unit 102*j*) is used, the required resolution calculating unit 102*e* calculates the required resolution according to a formula "DPI={F/(pt*0.3514)}*25.4".

For example, when the document type is the license card, the required resolution calculating unit 102*e* takes 6 pt as the character point number, 24 as the character size at which characters are recognizable by the OCR engine, and calculates the required resolution as DPI={24/(6*0.3514)}*25.4=322 dpi.

Since the processing from step SB-13 to step SB-16 shown in FIG. 3 is similar to the processing from step SA-13 to step SA-16 shown in FIG. 2, explanation thereof will be omitted.

Thus, in the present embodiment, an image is captured as an alternative to a reminder in normal work and the OCR recognition is used. As a result, the efficiency of document preparation is possible to be improved.

The resolution necessary for OCR recognition (character size at which characters are recognizable: 36*36) (required resolution) is 248 dpi (image size: 2050 dot*2900 dot) when a target document is an A4 document (210 mm*297 mm, 10.5 points).

In the present embodiment, this required resolution is compared with the resolution of the camera image data. As a result, an image optimal for character recognition is possible to be captured.

In recent years, with the spread of the mobile terminal (smart phone, tablets, and the like) 100, the usage form of the mobile terminal 100 including a camera has changed in work for which scanners is used conventionally.

This is because scanning with the camera mounted on the mobile terminal 100 has an advantage that the degree of freedom is high because there is no restriction on locations and image capturing media.

Meanwhile, there is a problem with the camera image captured by the mobile terminal 100 in that it is difficult to acquire image data at image quality equivalent to that acquired with the scanner because an environment about an ambient light amount, an image capturing direction, and/or motion during image capturing are often unstable.

Therefore, in the mobile scanner application installed in the mobile terminal 100 in the present embodiment, a high quality image is possible to be sensed and acquired.

Other Embodiments

Although the embodiment of the present disclosure is explained, the present disclosure may be implemented in various different embodiments within the scope of the technical idea described in claims, in addition to the embodiment.

For example, a mobile terminal 100 may perform processing in a standalone form, perform processing in response to a request from a client terminal (that is a body separate from the mobile terminal 100), and transmit a result of the processing to the client terminal.

Among all the processing explained in the embodiment, all or a part of the processing explained as being performed automatically are possible to be performed manually, or all or a part of the processing explained as being performed manually are possible to be performed automatically by a known method.

Besides this, the processing procedures, the control procedures, the specific names, the information including parameters such as registered data or search conditions of each processing, the screen examples or the database configurations shown in the specification and the drawings are possible to be optionally changed unless otherwise specified.

With respect to the mobile terminal 100, each constituent element shown in the drawings is functionally conceptual and does not necessarily need to be physically configured as shown in the drawings.

For example, all or any part of the processing functions of each device of the mobile terminal 100, particularly each processing function performed by a control unit 102, is achieved by the CPU and a program interpreted and executed by the CPU, or may be achieved as hardware by a wired logic.

Note that the program is recorded in a non-transitory computer readable recording medium including a programmed instruction for causing the computer to execute the method according to the present disclosure, which will be explained later, and the mobile terminal 100. That is, in a storage unit 106 such as the ROM or a hard disk drive (HDD), a computer program for giving instructions to the CPU in cooperation with an operating system (OS) and performing various types of processing is recorded. This computer program is executed by being loaded into the RAM and cooperates with the CPU to constitute a control unit.

This computer program may be stored in an application program server connected to the mobile terminal 100 via any network, and all or a part of the computer program are possible to be downloaded as necessary.

The program according to the present disclosure may be stored in a computer-readable recording medium, or may be configured as a program product. The "recording medium"

includes any "transportability physical medium" such as a memory card, a universal serial bus (USB) memory, a secure digital (SD) card, a flexible disk, a magneto-optical disk, the ROM, an erasable programmable read only memory (EPROM), an electrically erasable programmable read-only memory (EEPROM), a compact disc read-only memory (CD-ROM), a magnet disc (MO), a digital versatile disc (DVD), and a Blu-ray (registered trademark) Disc.

The "program" is a data processing method described in any language or description method, regardless of form such as source code, binary code, and the like. Note that that the "program" is not necessarily limited to a single program, but may include a program configured to be distributed as a plurality of modules or libraries, or a program that achieve its function in cooperation with a separate program represented by the OS. Well-known configurations and procedures are possible to be used for specific configurations and reading procedures for reading the recording medium in each device shown in the embodiments and installation procedures after reading.

Various databases and the like stored in the storage unit 106 are storage units that are memory devices such as the RAM, the ROM or the like, the fixed disk device such as the hard disk, the flexible disk, and/or the optical disk, and may store various programs, tables, databases, and/or files for web pages that are used for various types of processing and for provision of a website.

The mobile terminal 100 may be configured as an information processing device such as a known personal computer or may be configured by connecting any peripheral device to the information processing device. The mobile terminal 100 may be achieved by implementing software (including programs, data, etc.) that achieves the method of the present disclosure in the information processing device.

Furthermore, specific aspects of distribution and integration of the devices are not limited to those shown in the drawings, and all or a part thereof are possible to be configured to be distributed or integrated functionally or physically in any units according to various types of additions or the like or according to functional loads. That is, the embodiments may be optionally combined or the embodiments may be selectively performed.

According to this disclosure, a retry is automatically repeated until expected image data is possible to be captured. As a result, the work efficiency of a user is possible to be improved, and also an image at a constant image quality is possible to be captured without depending on the user.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. A mobile terminal comprising:
a memory; and
a processor coupled to the memory, wherein
the processor executes a process comprising:
acquiring a frame acquired by image capturing;
detecting document position data of a document from the frame;
determining a document type of the document;
calculating image quality of document image data of the document on the basis of the document position data and the document type;
determining whether the image quality is at a character recognizable level; and
acquiring a frame acquired by the image recapturing when it is determined that the image quality is not at the character recognizable level.

2. The mobile terminal according to claim 1, wherein
the detecting includes detecting a corner coordinate of the document from the frame,
the calculating includes calculating document resolution of the document image data on the basis of the corner coordinate and the document type, and
the determining whether the image quality is at the character recognizable level includes determining whether the document resolution is at the character recognizable level.

3. The mobile terminal according to claim 2, wherein
the calculating includes calculating the document resolution of the document image data on the basis of the number of pixels between the corner coordinates and a length of a side of the document based on the document type to acquire the minimum resolution as the document resolution.

4. The mobile terminal according to claim 1, wherein
the detecting includes detecting a layout of the document from the frame,
the calculating includes calculating document resolution of the document image data on the basis of the layout and the document type, and
the determining whether the image quality is at the character recognizable level includes determining whether the document resolution is at the character recognizable level.

5. The mobile terminal according to claim 2, wherein
the process further comprises calculating required resolution necessary for character recognition on the basis of a quality index value and the document type, and
the determining whether the image quality is at the character recognizable level includes determining whether the document resolution is at the character recognizable level on the basis of a comparison between the document resolution and the required resolution.

6. The mobile terminal according to claim 4, wherein
the process further comprises calculating required resolution necessary for character recognition on the basis of a quality index value and the document type, and
the determining whether the image quality is at the character recognizable level includes determining whether the document resolution is at the character recognizable level on the basis of a comparison between the document resolution and the required resolution.

7. The mobile terminal according to claim 2, wherein
the process further comprises calculating a required resolution on the basis of a character size that enables character recognition by OCR and the document type, and
the determining whether the image quality is at the character recognizable level includes determining whether the document resolution is at the character recognizable level on the basis of a comparison between the document resolution and the required resolution.

8. The mobile terminal according to claim 4, wherein the process further comprises calculating a required resolution on the basis of a character size that enables character recognition by OCR and the document type, and the determining whether the image quality is at the character recognizable level includes determining whether the document resolution is at the character recognizable level on the basis of a comparison between the document resolution and the required resolution.

9. The mobile terminal according to claim 1, wherein the process further comprises displaying determination reason data when it is determined that the image quality is not at the character recognizable level.

10. The mobile terminal according to claim 1, wherein the process further comprise performing an optical character recognition processing on the document image data to acquire character data.

11. The mobile terminal according to claim 1, wherein the process further comprises displaying the frame and/or the document image data.

12. The mobile terminal according to claim 1, wherein the frame is uncompressed image data.

13. The mobile terminal according to claim 1, wherein the detecting includes detecting the document position data of the document from the frame by using an edge detection method and/or a feature point matching method.

14. The mobile terminal according to claim 1, wherein the determining the document type includes determining the document type of the document by using a layout recognition method and/or a size detection method.

15. An image processing method comprising:

acquiring a frame acquired by image capturing;

detecting document position data of a document from the frame;

determining a document type of the document;

calculating image quality of document image data of the document on the basis of the document position data and the document type;

determining whether the image quality is at a character recognizable level; and acquiring a frame acquired by the image recapturing when it is determined that the image quality is not at the character recognizable level.

16. A non-transitory computer readable recording medium having stored therein a program, the program causing a computer to execute a process comprising:

acquiring a frame acquired by image capturing;

detecting document position data of a document from the frame;

determining a document type of the document;

calculating image quality of document image data of the document on the basis of the document position data and the document type;

determining whether the image quality is at a character recognizable level; and acquiring a frame acquired by the image recapturing when it is determined that the image quality is not at the character recognizable level.

* * * * *